US006817081B2

(12) United States Patent
Schadenberg et al.

(10) Patent No.: US 6,817,081 B2
(45) Date of Patent: Nov. 16, 2004

(54) PROCESS FOR PROVIDING A SURFACE WITH A FIRE-PROOF AND/OR WEAR RESISTANT LINING

(75) Inventors: Hendrik Schadenberg, Amsterdam (NL); Anthonij Wolfert, Amsterdam (NL)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 10/398,299

(22) PCT Filed: Oct. 2, 2001

(86) PCT No.: PCT/EP01/11399

§ 371 (c)(1), (2), (4) Date: Apr. 3, 2003

(87) PCT Pub. No.: WO02/29344

PCT Pub. Date: Apr. 11, 2002

(65) Prior Publication Data

US 2004/0020026 A1 Feb. 5, 2004

(30) Foreign Application Priority Data

Oct. 4, 2000 (EP) ........................................... 00308764

(51) Int. Cl.[7] ................................................ B23P 15/00

(52) U.S. Cl. ............................ 29/458; 29/447; 29/460; 427/271; 427/372.2

(58) Field of Search .......................... 29/458, 447, 460, 29/897.32, 890.051, 890.01; 427/156, 224, 228, 271, 372.2; 428/102, 99; 264/129; 413/18; 299/104, 105

(56) References Cited

U.S. PATENT DOCUMENTS

| | | | | |
|---|---|---|---|---|
| 4,284,447 A | * | 8/1981 | Dickens et al. | 156/78 |
| 5,092,024 A | * | 3/1992 | McGarvey | 29/460 |
| 5,353,503 A | * | 10/1994 | Garot | 29/897.3 |

FOREIGN PATENT DOCUMENTS

| | | | |
|---|---|---|---|
| DE | 4416022 | 11/1995 | F27D/1/14 |
| SU | 1368598 | 1/1988 | F27D/1/00 |
| WO | 93/16820 | 9/1993 | B21B/27/08 |

OTHER PUBLICATIONS

M.S. Crowley. “Equation helps select refractory anchor system”, published in Oil and Gas Journal , Aug. 30, 1982. pp. 122–125.

Subrata Banerjee “Monolithic Refractories” pp. 55–56.

* cited by examiner

*Primary Examiner*—I Cuda Rosenbaum
*Assistant Examiner*—Stephen Kenny
(74) *Attorney, Agent, or Firm*—Charles W. Stewart

(57) ABSTRACT

A process to provide a surface with a fire-proof and/or wear resistant lining involving the following steps:

a) mechanically fixing anchoring means to the surface, which anchoring means are pre-coated with a coating that melts at a temperature in the range from 40° C. to 100° C.;
b) applying a lining material onto the surface provided with the anchoring means;
c) curing the lining material to obtain a solid mass; and
d) drying the lining, to a temperature at least sufficient to melt the coating on the anchoring means, to obtain a fire-proof and/or wear resistant lining.

Anchoring means used in this process.

13 Claims, No Drawings

PROCESS FOR PROVIDING A SURFACE WITH A FIRE-PROOF AND/OR WEAR RESISTANT LINING

FIELD OF THE INVENTION

This invention relates to a process for providing a surface with a fire-proof and/or wear resistant lining, further referred to in this application as lining. In engineering it is common practice to apply a lining of a fireproof and/or wear-resistant material to a surface which is subjected to high temperatures and/or mechanical and/or chemical loads, such as the surfaces of vessels, vessel internals or pipe-work connecting vessels used in, for example, the cracking of petroleum products.

BACKGROUND OF THE INVENTION

One of the major drawbacks of the processes for applying such a lining to a surface that are presently used, is the commercially unattractive installation time. For example, the installation time for a fire-proof and/or wear resistant lining consisting of a hex mesh or floor steel anchoring system in combination with a phosphate bonded ramming mass can amount up to 75 hours/$m^2$. In addition the linings of this type can be sensitive to thermal shocks and are difficult to repair. Furthermore it is difficult to maintain a uniform quality.

Commercially more attractive shorter installation times can be obtained by using a lining comprising a single point anchoring system, such as for example the system described in U.S. Pat. No. 5,353,503. A problem of these rather large anchors is that due to the difference in thermal expansion of the anchors and the lining, tensions can occur between the anchors and the lining, resulting in cracks in the lining. The cracking can even occur at the relatively moderate temperatures applied during drying of the lining. This problem is especially encountered when so-called wholly or partly cement-bonded materials with a low abrasion resistance are used as a lining material.

In his article titled "Equation helps select refractory anchor system", published in Oil &Gas Journal, Aug. 30, 1982, pages 122–125, M. S. Crowley describes the use of mastic tape, wax and plastic coatings to cover the ends of independent anchors before the lining material is applied. According to this article, in service, i.e. during operation, the coating burns out and leaves a small void space around the anchor so it can expand thermally without stressing the lining. This article is, however, silent about cracking problems which occur due to the build up of stress during drying of a lining.

Because the described anchoring means are welded onto the surface, coating can only be applied after this welding step in order to avoid any damage to the coating. This adds another step to the installation process, making it more complicated and more laborious, resulting in increased installation time.

SUMMARY OF THE INVENTION

It would be useful to provide a less laborious process for providing a surface with a fire-proof and/or wear resistant lining, resulting in a commercially attractive installation time, while preventing the lining from cracking during drying of the lining.

This is achieved by a process to provide a surface with a fire-proof and/or wear resistant lining comprising the following steps:

a) mechanically fixing anchoring means to the surface, which anchoring means are pre-coated with a coating that melts at a temperature in the range from 40 to 100° C.;

b) applying a lining material onto the surface provided with the anchoring means;

c) curing the lining material to obtain a solid mass;

d) drying the lining, to a temperature at least sufficient to melt the coating on the anchoring means, to obtain a fire-proof and/or wear resistant lining.

DETAILED DESCRIPTION OF THE INVENTION

It has been found that use of this process for providing a surface with a fire-proof and/or wear resistant lining results in a less laborious process with a commercially attractive installation time.

The anchoring means in step a) can have any kind of shape suitable for the purpose of holding the lining material. Suitable shapes include a (partial) Y, V or U shape or the shape of a cup, optionally provided with openings through which the lining material can enter the cup.

The size, i.e. the height and diameter, of the anchoring means depends on the type of lining material used, the target thickness of the fire-proof and/or wear resistant lining and the shape of the anchoring means itself. Depending on these factors, the size of the anchoring means can vary between wide ranges. The advantages of the invention are especially clear when the anchoring means has a large diameter, i.e. a diameter of at least 3 cm. If the anchoring means has a Y, V or U shape, the diameter is defined herein as the maximum distance between the two extremities at the top. If the anchoring means has a cup-like shape, the diameter is defined herein as the maximum distance between two points on the circumference of the cup. The height is measured perpendicular to the diameter. Preferably the diameter is in the range from 3 to 15 cm and the height is in the range from 1 to 15 cm. Cup-like anchoring means preferably have a height in the range from 0.5 to 5 cm, more preferably in the range from 1 to 2 cm, and preferably a diameter in the range from 3 to 10 cm, more preferably in the range from 3 to 7 cm. The wall-thickness of such a cup-like anchoring means preferably lies in the range from 0.1 to 5 mm, more preferably in the range from 0.5 to 2 mm.

An example of relatively large anchoring means is the cup-like shaped anchoring means described in U.S. Pat No. 5,353,503 hereby incorporated by reference. The anchoring means, described in U.S. Pat No. 5,353,503 hereby incorporated by reference, have a polygonal base portion, a plurality of lips extending perpendicularly from the polygonal base portion, a plurality of slotted holes extending through a portion of said lips and a threaded aperture extending through the polygonal base portion for screwing the anchoring means onto a base part.

An example of such cup-like shaped anchoring means is the so called SPEED CELL (SPEED CELL is a trademark owned by Silicon). Another example of cup-like anchoring means is the TACO anchors (TACO is a trademark of Plibrico).

The invention is especially advantageous when used in combination with such large cup-like anchoring means. Generally the cup-like anchoring means are completely embedded within the lining material. Because the cup-like anchoring means are completely embedded, stress, due to the difference in thermal expansion between the cup-like anchoring means and the lining material, is not or hardly absorbed by the surroundings of the anchoring means. If no measures are taken, the difference in thermal expansion between the cup-like anchoring means and the lining material therefore results in cracking of the lining. Coating the cup-like anchoring means according to this invention prevents the lining from cracking.

The anchoring means can be manufactured from any material suitable to withstand the high temperatures during drying and/or firing and operation of an object wherein the fire-proof and/or wear resistant lining has been applied. Preferably the anchoring means is manufactured from a metal or alloy. Preferably the anchoring means is manufactured from, preferably austenitic, stainless steel.

The anchoring means are pre-coated before installation, thus before attachment to the surface or for example on to a base part which is already attached to the surface. Suitably the coating melts at a temperature in the range from 40 to 100° C., preferably in the range from 60 to 90° C., and more preferably in the range from 60 to 70° C. During drying of the lining in step d), the coating melts and leaves a small void space between the anchor and the solid lining material. The coating can be any coating known to one skilled in the art to melt during drying step d) as described herein. It is believed that the melted material will be absorbed by the porous lining surrounding the anchor. Preferably the coating is a wax. More preferably the coating is a microcrystalline wax, since coatings of such microcrystalline waxes are less brittle and adhere better to the anchoring means than normal waxes. This is advantageous when the pre-coated anchors are to be transported. The melting point of the microcrystalline wax can vary within the wide range mentioned hereabove. Examples of suitable microcrystalline waxes include Shell LMP, MMP and HMP waxes. Most preferred are microcrystalline waxes with a low melting point, i.e. a melting point in the range from 60 to 70° C. The microcrystalline waxes with a low melting point are again less brittle and adhere better to the anchoring means than microcrystalline waxes with a high melting point. An example of a microcrystalline wax with a low melting point is the Shell LMP wax, having a melting point in the range from 62 to 66° C.

The, preferably microcrystalline, wax has a hardness, as determined by the ASTM D1321 Test Method for Needle Penetration at 43° C. ($PEN_{43° C.}$), of from 70 to 160 dmm (1 dmm=0.1 mm). Wax coatings having a hardness within this range are more flexible which is advantageous during transport.

The coating can be applied to the surface of the anchoring means in any way known to one skilled in the art. When the coating is a wax, the wax is advantageously applied to the anchoring means by dipping into or spraying with molten wax. Most preferably the wax is applied to the anchoring means by dipping into molten wax.

The coating preferably has a thickness in the range of from 0.01 to 2 mm, more preferably in the range from 0.1 to 0.5 mm. The coating is preferably applied to the whole of the anchoring means.

The pre-coated anchoring means in step a) is fixed, directly or indirectly via other (base) part(s) to the surface. Preferably the anchoring means is fixed to the surface via a base part, such as for example a pin or stud. The anchoring means is fixed by using a mechanical technique such as screwing or clicking. If the anchoring means is fixed indirectly via a base part, the anchoring means is preferably screwed upon such a base part.

The pre-coated anchoring means is fixed to the other (base) part(s) or the surface in a mechanical way such that the coating remains essentially intact. By remaining essentially intact is meant that preferably 75% or more of the coating remains intact, more preferably 90% or more remains intact and even more preferably 99% or more of the coating remains intact during the attachment of the anchoring means to the other (base) part(s) or the surface.

If present, the base part generally has the shape of a pin or stud. For the purpose of the invention it can, however, also be more than one pin or a small plate or a spring or other means which can be attached to the surface and to which the anchoring means can be attached. The size, i.e. the height and diameter, of the base part depends on the type of lining material used and the target thickness of the fire-proof and/or wear resistant lining. The height of the base part, defined as the distance the base part stands out from the surface, depends mainly on the target thickness of the final fire-proof and/or wear resistant lining. For practical purposes the height of the base part suitably lies in the range from 0.1 to 10 cm, more suitably in the range from 0.5 to 5 cm. The diameter of the base part can vary between wide ranges. For practical reasons the base part suitably has a diameter ranging from 0.2 to 2 cm, more preferably from 0.2 to 1 cm. The base part can be manufactured from any material suitable to withstand the high temperatures during drying and/or firing and operation of an object wherein the fire-proof and/or wear resistant lining has been applied. Suitable materials include metals and metal alloys. Preferably the base part is manufactured from a metal or alloy. More preferably the base part is manufactured from, preferably austenitic, stainless steel.

The optional base part of the anchoring means is fixed, directly or indirectly via extra parts, to the surface to be lined on one side and to the anchoring means on the other side. If the base part is manufactured from metal or metal alloy it is preferably welded to the surface in step a). If appropriate, the base part can also be attached to the surface by other means than welding, such as for example by mechanical ways, such as screwing or clicking. The base part can be coated or non-coated. If the base part is manufactured from a metal or alloy and is welded onto the surface, the base part is preferably non-coated.

Preferably the anchoring means is attached to the surface as follows:

i) welding a base part, having a threaded end remote from the surface, to the surface.

ii) screwing anchoring means, on the base part.

The lining material in step b) can be any material known in the art to be suitable for this purpose. Suitably the lining material is a monolithic refractory material. Suitable examples include traditional phosphate bonded materials, such as Resco AA22 (a product of Resco Products UK) and Curas 90 PF (a product of Gouda Vuurvast); cement bonded materials, including conventional castables as well as so called free-flow material, such as Sureflow 93 LC (a product of Resco Products UK); and materials with a mixed bonding system, i.e. partly cement bonded and partly phosphate bonded such as Actchem (a product of Dramicon).

The advantages of the invention are especially clear when cement bonded or partly cement bonded materials are used, which have a superior abrasion resistance. Materials with a superior abrasion resistance are understood to be materials having an abrasion loss, measured according to ASTM method C704, of less than 5. Preferably the abrasion loss is in the range of 0.1–4, more preferably in the range from 1–3. Preferably the lining material contains less than 3% phosphates.

With the process of the present invention it is possible to combine a cement bonded or partly cement bonded lining, and especially a free flow cement bonded lining, with cup-like anchoring means, especially large cup-like anchoring means having a diameter of at least 3 cm, to obtain an essentially crack free lining. The present invention therefore also provides a fire-proof and/or wear resistant lining comprising a cement bonded or partly cement bonded lining material and cup-like anchoring means, wherein a small void space is present between the anchoring means and the lining material.

The lining material can be fibre reinforced, preferably with metal, more preferably with steel fibres.

The target thickness of the fire-proof and/or wear resistant lining depends on the unit wherein it is used. Factors influencing the target thickness are the purpose of this unit and its shape. Suitable lining thickness' are between 1.5 and 15 cm, more preferably between 1.5 to 3 cm. Suitable ways to apply the lining material include moulding, hand-packing, pouring, simple casting or vibration casting, gunning and ramming methods. The temperature and pressure applied during application of the lining material in step b) are not critical at all, except that coating on the anchors should not disappear during this step. Preferred process conditions for step b) include an atmospheric pressure and an ambient temperature, suitably a temperature in the range of 0 to 40° C.

During step c) more or less fluid lining material is cured, preferably during 6 to 24 hours, to obtain a solid mass. The temperature during curing suitably lies in the range from 0 to 50° C., and more preferably in the range from 0 to 40° C. The pressure applied during drying is not critical. For practical purposes an atmospheric pressure is preferred.

Drying step d) can be performed as known to one skilled in the art, for example such as described in "Monolithic refractories" by Subrata Banerjee, pages 54 to 56. The temperature applied is at least sufficient to melt the coating on the anchoring means. During this step water will evaporate from the lining and the coating will melt. Suitable temperatures lie in the range from 40° C. gradually increasing to 600° C. The pressure applied during drying is not critical. For practical purposes an atmospheric pressure is preferred.

After step d) the lining can be optionally fired at a higher temperature, suitably lying in the range from 600 to 900° C., or can be heated further to the temperature required for the process to be carried out in an object.

The invention further provides anchoring means, coated with a coating that melts at a temperature in the range from 40 to 100° C., which can be mechanically fixed directly or indirectly via other (base) part(s) to a surface. Preferences are as described hereinbefore.

Preferably the anchoring means is used in combination with a base part and thus the invention also provides a kit of parts comprising:

a) a base part b) an anchoring means as described above, which can be mechanically fixed to the base part.

The process according to the invention for applying a fire-proof and/or wear resistant lining to a surface can advantageously be used when repairing or replacing an existing lining in a unit for refinery or chemical processing, or for repairing an already existing lining, which is damaged. The use of the process according to the invention will result in a less laborious repair process and a shorter repair time. The damaged existing lining can be any type of lining known to one skilled in the art and includes for example combinations of hex-mesh, floor-steel or single point anchoring systems with brick, phosphate bonded ramming mass or cement-bonded lining material.

The process according to the invention can advantageously be carried out upon all surfaces known to one skilled in the art to be coated with a fire-proof and/or wear resistant lining. Use of a fire-proof and/or wear resistant lining applied to a surface according to this process is especially advantageous on curved or other non-planar surfaces, where a traditional combination of hex mesh or floor steel based systems with phosphate bonded materials requires extra labour-intensive steps of bending and reforming the anchoring system. Advantageous applications for the fire-proof and/or wear resistant lining according to this invention are for example the applications in units for refinery and chemical processing. The fire-proof and/or wear resistant lining can be advantageously applied in reactors, regenerators and especially cyclones and especially in the reactors, regenerators and cyclones of a fluidized catalytic cracking process.

The invention will now be illustrated by the following non-limiting examples.

EXAMPLE 1

A cup-like anchoring means as described in U.S. Pat. No. 5,353,503 (SPEED CELL, obtained from Silicon) was coated with a 0.3 mm thick coating by dipping in molten microcrystalline wax with a low melting point (LMP microcrystalline wax, obtained from SHELL, having a congealing point of 62–66° C.), with the typical values as stated in table 1.

TABLE 1 specification of the microcrystalline wax.

| Property | Typical Value |
|---|---|
| Melting point, ° C. (ASTM D938) | 64 |
| Penetration at 43° C., (0.1 mm) (ASTM D1321) | 101 |
| Oil content, % m (ASTM D721) | <0.1 |

EXAMPLE 2

A transparent perspex mould was made (1 $m^2$). The internal spacing between the front and the back plate of the mould was 25 mm. The speed cell anchors of Example 1 were attached to the perspex back plate of the mould using brass bolts in combination with stainless steel spacer tubes (around the brass bolts). The anchoring means almost touched the front plate. A spacing of 8–10 cm for the speed cells was used. Sureflow 93 LC (obtained from Resco Products UK) with grains of about 2 mm was poured into the mould.

After 24 hours curing at ambient temperature, i.e. about 20° C., the front panel of the mould was removed and the anchors were detached from the back panel. It appeared that the anchoring means were completely filled up with material. After drying at about 110° C., the plate was free of cracks. The plate was fired to a temperature of 815° C. during 24 hours. The test plate remained free of cracks.

COMPARATIVE EXAMPLE A

Example 2 was repeated, except that instead of the coated anchoring means of example 1, non-coated cup-like anchoring means as described in U.S. Pat. No. 5,353,503 (SPEED CELL, obtainable from Silicon) were used. After drying at about 110° C., fine cracks were observed and after firing the test plate to a temperature of 815° C. during 24 hours, the test plate showed severe cracking around the anchoring means.

We claim:

1. A process to provide a surface with a fire-proof and/or wear resistant lining comprising the following steps:

a) mechanically fixing anchoring means to the surface, which anchoring means are pre-coated with a coating that melts at a temperature in the range from 40° C. to 100° C.;

b) applying a lining material onto the surface provided with the anchoring means;

c) curing the lining material to obtain a solid mass; and d) drying the lining, to a temperature at least sufficient to melt the coating on the anchoring means, to obtain a fire-proof and/or wear resistant lining.

2. The process of claim 1, additionally comprising step:

e) firing the lining.

3. The process of claim 1, wherein the anchoring means are attached to the surface via a base part.

4. The process of claim 3, wherein the base part is welded to the surface and the anchoring element is screwed upon the base part.

5. The process of claim 1, wherein the anchoring means has a diameter of at least 3 cm.

6. The process of claim 1, wherein the anchoring means has a cup-like shape.

7. The process of claim 1, wherein the anchoring means is manufactured from stainless steel.

8. The process of claim 1, wherein the anchoring means is coated with a coating that melts at a temperature in the range from 60° C. to 90° C.

9. The process of claim 1, wherein the coating is a microcrystalline wax, having a melting point in the range from 60° C. to 70° C.

10. The process of claim 1, wherein the coating is a wax having a PEN43° C. value of from 70 dmm to 160 dmm.

11. The process of claim 10, wherein the pre-coated anchoring means are obtained by dipping the anchoring means into molten wax.

12. The process of claim 1, wherein the lining material in step b) is a cement bonded or partly cement bonded lining material.

13. The process of claim 12, wherein the cement bonded or partly cement bonded material lining material has an abrasion loss, measured according to ASTM method C704, of less than 5.

* * * * *